US008240565B2

(12) United States Patent
Iizuka (10) Patent No.: US 8,240,565 B2
(45) Date of Patent: Aug. 14, 2012

(54) INFORMATION TRANSMITTING DEVICE (75) Inventor: Nobuo Iizuka, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 209 days.

(21) Appl. No.: 12/782,872

(22) Filed: May 19, 2010

(65) Prior Publication Data

US 2010/0303285 A1 Dec. 2, 2010

(30) Foreign Application Priority Data

May 29, 2009 (JP) ................................. 2009-130021

(51) Int. Cl.
*G06F 19/00* (2006.01)
*G06Q 30/00* (2006.01)
*G06Q 90/00* (2006.01)
(52) U.S. Cl. ......... 235/385; 235/375; 382/103; 382/100
(58) Field of Classification Search .................. 235/385, 235/375, 487, 435, 376; 382/100, 103
See application file for complete search history.

(56) References Cited

U.S. PATENT DOCUMENTS

| 5,780,826 | A | 7/1998 | Hareyama et al. | |
| 8,090,764 | B2 * | 1/2012 | Sato et al. | 709/203 |
| 2006/0149496 | A1 * | 7/2006 | Takeuchi | 702/150 |

FOREIGN PATENT DOCUMENTS

| JP | 3085468 B2 | 7/2000 |
| JP | 2001-301979 A | 10/2001 |
| JP | 3750132 B2 | 3/2006 |
| JP | 2006-124182 A | 5/2006 |

OTHER PUBLICATIONS

Japanese Office Action dated Jan. 14, 2011 (and English translation thereof) in counterpart Japanese Application No. 2009-130021.

* cited by examiner

*Primary Examiner* — Edwyn Labaze
(74) *Attorney, Agent, or Firm* — Holtz, Holtz, Goodman & Chick, PC (57) ABSTRACT

An information transmitting device 7 with a light source 3 provided on each container 2 which can be arranged and placed so that a surface having the light source can be hidden. Each information transmitting device judges whether or not in a condition where an own container 2 can be monitored from an imaging direction of an external imaging device and placed so as to hide the light source installed on other containers 2. When judged as affirmative, location information about the other containers is transmitted from the information transmitting device installed on the other containers, and location information about the own container is added to the received location information. This information is transmitted to a storage space which is imaged in an information receiving device 4 by controlling the light source to modulate the received information and to repeatedly flash in terms of time based on the modulated information.

9 Claims, 8 Drawing Sheets

INFORMATION TRANSMITTING DEVICE

CROSS-REFERENCE TO RELATED APPLICATION

This application is based upon and claims the benefit of priority from the prior Japanese Patent Application No. 2009-130021, filed May 29, 2009, the entire contents of which is incorporated herein by reference.

BACKGROUND OF THE INVENTION

1. Field of the Invention

The present invention relates to an information transmitting device such as an information transmitting device suitable for use in the cargo handling management of freight containers and the like.

2. Description of the Related Art

To smoothly manage cargo handling in a large-scale collection area for freight containers (hereinafter referred to as a container yard), it is considered important for a manager to grasp the location of each container.

The reason for this is, when a container is not in its intended location and is placed in a wrong location, the manager is required to search for the container, wasting labor and time.

Various conventional technologies exist with regard to the above-described container management.

For example, in Japanese Patent No. 3085468, a self-propelling container handling device is described including an imaging device for reading an identification code (such as an owner code or a serial number) on a container and a detection means for detecting the location of the container (such as that using a global positioning system [GPS]).

This self-propelling container handing device collects owner codes, serial numbers, and the like, as well as placement locations, and transmits the collected information to, for example, a computer installed in a department managing the container yard.

Also, for example, in Japanese Patent Application Laid-Open (Kokai) Publication No. 2006-124182, an invention is described in which a plurality of cameras placed in a container yard monitors the status of the overall area of the container yard.

However, in a technology using the above-described self-propelled container handling device, the main components (imaging device and detection means) for collecting information are only included in the "self-propelled container handling device". Therefore, there is an inconvenience in that information on containers carried by a handling device other than the self-propelled container handling device, such as a large-scale handling device referred to as a gantry crane, cannot be collected.

More specifically, containers transported by a ship are unloaded from the ship using a gantry crane, and each of which is temporarily placed in a random location to shorten the berthing time of the ship. Therefore, a problem occurs in that, when moving these temporarily placed containers to designated locations using the above-described "self-propelled container handling device", the management department does not know the locations thereof, and time is wasted in searching for the containers.

In the above-described technology in which a plurality of cameras placed in a container yard is used, although the status of the overall area of the container yard can be monitored, information on individual containers (owner code, serial number, etc.) cannot be obtained. Therefore, the individual locations of temporarily placed containers cannot be known.

SUMMARY OF THE INVENTION

The present invention has been conceived to solve the above-described problems. An object of the present invention is to provide an information transmitting device by which, in an intended place, information required to find an object is transmitted from the object itself even when the object is difficult to manage as a result of being stacked and the like.

In order to achieve the above-described object, in accordance with one aspect of the present invention, there is provided an information transmitting device with a light emitting section provided on each respective object which can be arranged and placed so that a surface having the light emitting section can be hidden, comprising a first judgment means for judging whether or not in a condition where an own object provided with the information transmitting device can be monitored from an imaging direction of an external imaging device and is placed so as to hide the light emitting section installed on a first other object; a reception means for receiving location information about the first other object transmitted from the information transmitting device installed on the first other object, when judged as affirmative by the first judgment means; an addition means for adding location information of the own object provided with the information transmitting device to location information received by the reception means; a modulation means for modulating location information received by the reception means and location information added by the addition means; and a first transmission means for transmitting location information to a storage space which is imaged in the external imaging device by controlling the light emitting section to repeatedly flash in terms of time based on location information modulated by the modulation means.

In accordance with another aspect of the present invention, there is provided a computer-readable storage medium having stored thereon a program that is executable by a computer in an information transmitting device with a light emitting section provided on each respective object which can be arranged and placed so that a surface having the light emitting section can be hidden, the program being executable by the computer to perform a process comprising first judgment processing which judges whether or not in a condition where an own object provided with the information transmitting device can be monitored from an imaging direction of an external imaging device and is placed so as to hide the light emitting section installed on a first other object; reception processing which receives location information about the first other object transmitted from the information transmitting device installed on the first other object, when judged as affirmative by the first judgment processing; addition processing which adds location information of the own object provided with the information transmitting device to location information received by the reception processing; modulation processing which modulates location information received by the reception processing and location information added by the addition processing; and first transmission processing which transmits location information to a storage space that is imaged in the external imaging device by controlling the light emitting section to repeatedly flash in terms of time based on location information modulated by the modulation processing.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

The present invention will hereinafter be described in detail with reference to the preferred embodiments shown in the accompanying drawings where the present invention has been applied to a container as an object.

Figure 1:
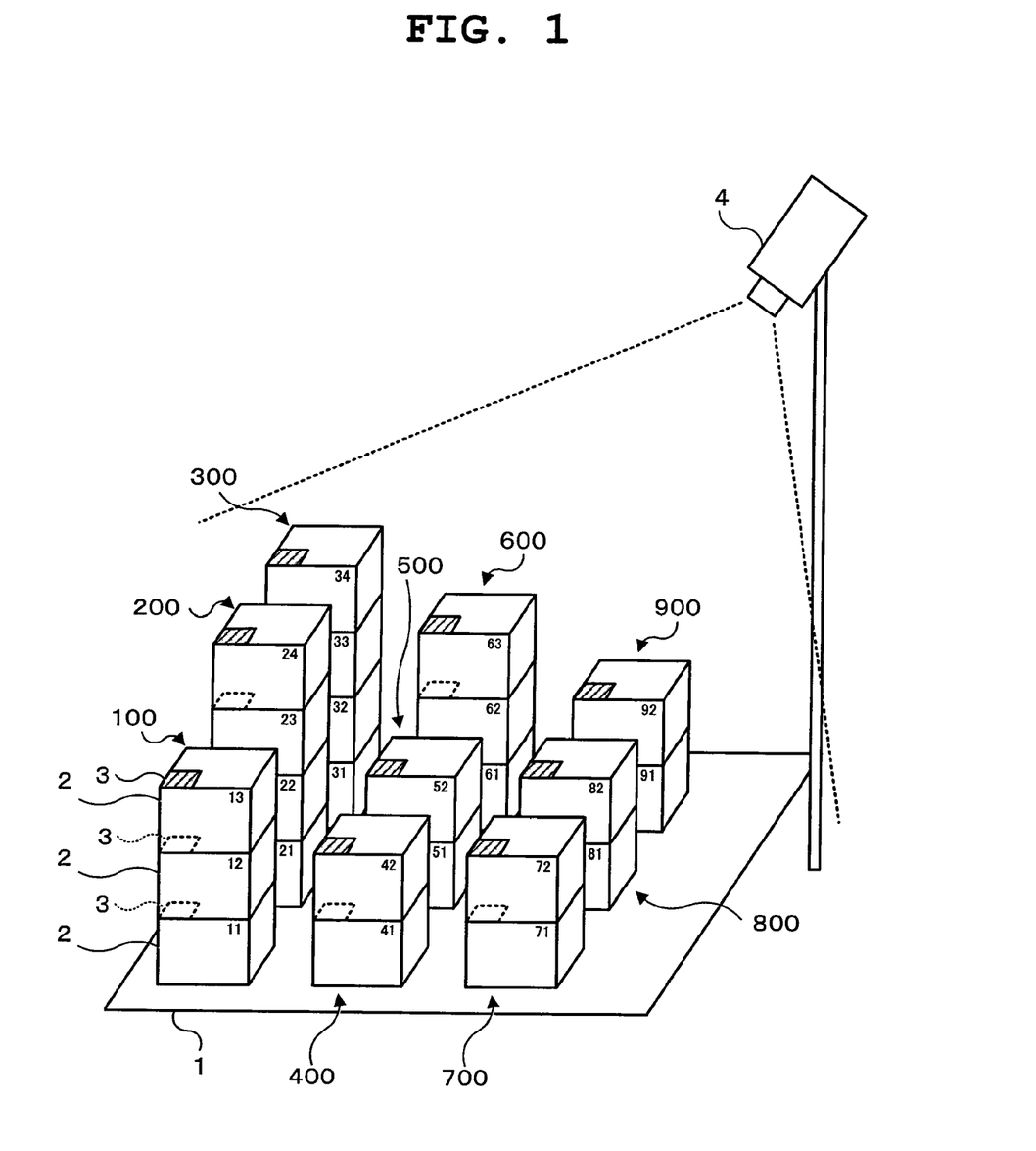
FIG. 1 is a usage schematic diagram of an information transmitting device according to an embodiment.

FIG. 1 is a usage schematic diagram of an information transmitting device according to the embodiment.

In FIG. 1, a light source 3, which is a component constituting an information transmitting device 7 (see FIG. 4) of the embodiment, is provided on each of a number of cargoes, namely each container 2, placed in a container yard 1.

Typically, containers 2 are often stacked to effectively use space in consideration of the location. In FIG. 1, an example is shown in which the containers 2 are stacked into four tiers, three tiers, and two tiers.

The information transmitting device 7 (see FIG. 4) including the light source 3 provides the following two functions.

A first function is to generate information (such as an owner code, a serial number, or the like, referred to hereinafter as ID) identifying the individual container 2 to which the information transmitting device 7 has been attached.

A second function is to perform a following operation when the container 2 to which the information transmitting device 7 has been attached is stacked with another container 2, in accordance with the order the containers 2 are stacked.

<Container 2 located in the bottommost tier>

The information transmitting device 7 transmits its own identification information (ID) to the information transmitting device 7 of a container 2 in an upper tier.

<Container Located in a Middle Tier so as to be Interposed between an upper-tier container 2 and a lower-tier container 2>

The information transmitting device 7 transmits its own ID and the ID transmitted from the lower tier to the information transmitting device 7 of a container 2 in an upper tier.

<Container 2 located in the uppermost tier>

The information transmitting device 7 modulates information including its own ID and the IDs transmitted from the lower tier into a flashing light pattern and transmits this flashing light pattern by the light source 3 included in the device itself.

Here, "modulates . . . into a flashing light pattern . . . and transmits this flashing light pattern" refer to the transmission of information symbols binarized by a combination of a light "ON" period (lighted period or high luminance light emission period) and a light "OFF" period (unlighted period or low luminance light emission period). A light transmission technology such as this is already known, as described in, for example, Japanese Patent No. 3750132.

Here, as shown in FIG. 1, the containers 2 are placed to form three rows and three columns such that each of which includes a random number of stacked containers 2 (at this time, each light source 3 is hidden from view when viewed from the imaging direction of an information receiving device 4).

When an applicable ID, such as an ID of two digits ("11" to "92") written in the upper-right corner on the front surface of each container 2, is given to each container 2, the light source 3 of each container 2 located in the uppermost tier in the order of stacking transmits the following information.

In FIG. 1, in a front-left container group 100 where the containers 2 are stacked in three tiers, the light source 3 of the container 2 in the uppermost tier transmits information including the respective IDs "11" and "12" of the two containers 2 under the uppermost container 2 and its own ID "13" using a flashing light pattern.

In a center-left container group 200 where the containers 2 are stacked in four tiers, the light source 3 of the container 2 in the uppermost tier transmits information including the respective IDs "21", "22" and "23" of the three containers 2 under the uppermost container 2 and its own ID "24" using a flashing light pattern.

In a rear-left container group 300 where the containers 2 are stacked in four tiers, the light source 3 of the container 2 in the uppermost tier transmits information including the respective IDs "31", "32", and "33" of the three containers 2 under the uppermost container 2 and its own ID "34" using a flashing light pattern.

In a front-center container group 400 where the containers 2 are stacked in two tiers, the light source 3 of the container 2 in the uppermost tier transmits information including the ID "41" of the container 2 under the uppermost container 2 and its own ID "42" using a flashing light pattern.

In a container group 500 in the center in the row direction and the column direction where the containers 2 are stacked in two tiers, the light source 3 of the container 2 in the uppermost tier transmits information including the ID "51" of the container 2 under the uppermost container 2 and its own ID "52" using a flashing light pattern.

In a rear-center container group 600 where the containers 2 are stacked in three tiers, the light source 3 of the container 2 in the uppermost tier transmits information including the respective IDs "61" and "62" of the two containers 2 under the uppermost container 2 and its own ID "63" using a flashing light pattern.

In a front-right container group 700 where the containers 2 are stacked in two tiers, the light source 3 of the container 2 in the uppermost tier transmits information including the ID "71" of the container 2 under the uppermost container 2 and its own ID "72" using a flashing light pattern.

In a center-right container group 800 where the containers 2 are stacked in two tiers, the light source 3 of the container 2 in the uppermost tier transmits information including the ID "81" of the container 2 under the uppermost container 2 and its own ID "82" using a flashing light pattern.

In a rear-right container group 900 where the containers 2 are stacked in two tiers, the light source 3 of the container 2 in the uppermost tier transmits information including the ID "91" of the container 2 under the uppermost container 2 and its own ID "92" using a flashing light pattern.

An information receiving device 4 is installed at a location suitable for monitoring the entire container yard 1. In other words, the information receiving device 4 is installed such that a location where the flashing light patterns from all light sources 3 of the container group 100 to the container group 900 can be monitored and serves as an observation point.

A two-dimensional image sensor such as a charge-coupled device (CCD) or a complementary metal-oxide semiconductor (CMOS) is included in the information receiving device 4, and the information receiving device 4 identifies the position of each light source 3 within frame images periodically outputted from the image sensor. Then, the information receiving device 4 reproduces information transmitted from each light source 3 by detecting the flashing light pattern of each light source 3 through comparison of the frame images on a time line.

An information receiving device 4 that operates as described above is also described in, for example, Japanese Patent No. 3750132.

Figure 2:
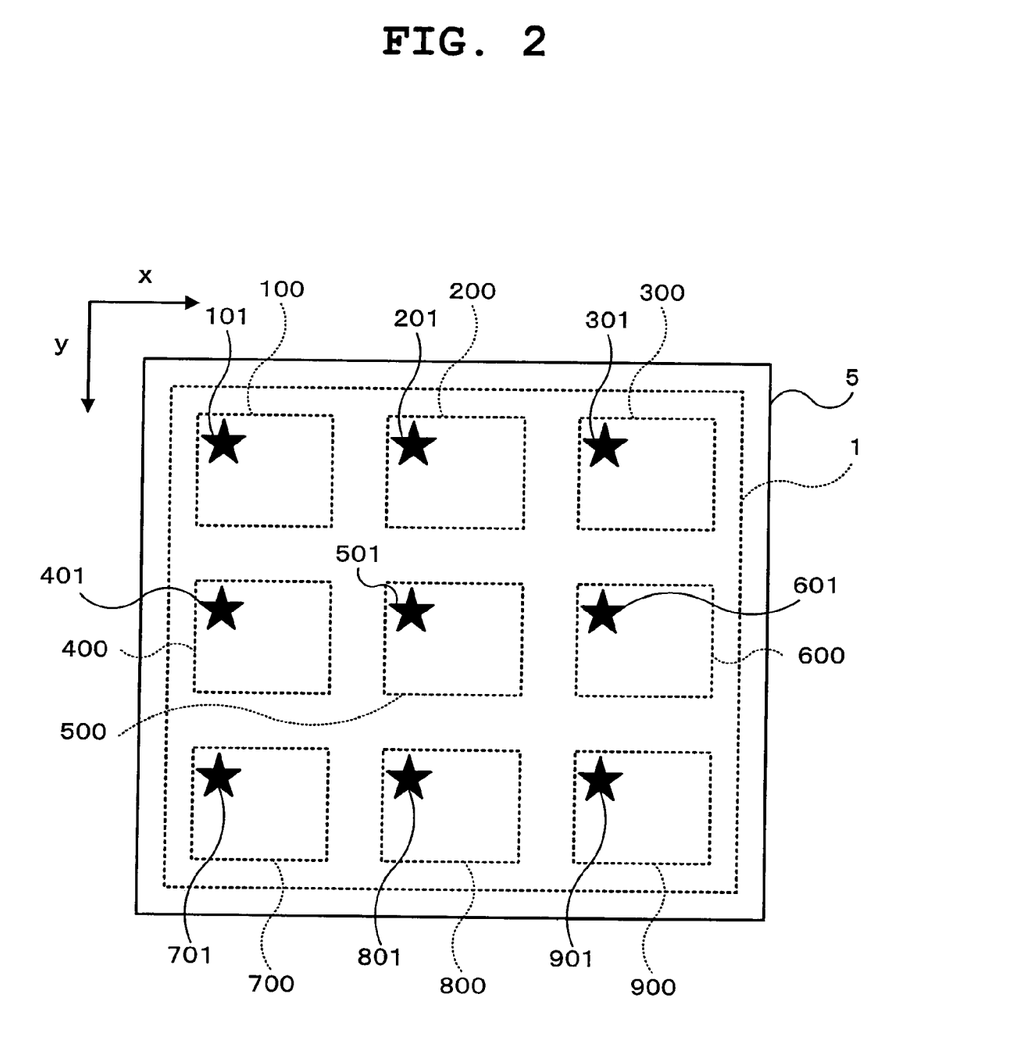
FIG. 2 is a conceptual diagram of identification of light source locations by an information receiving device 4.

FIG. 2 is a conceptual diagram of identification of light source locations by the information receiving device 4.

In FIG. 2, an image 5 is a composite of several frame images periodically outputted from the image sensor included in the image receiving device 4.

This image 5 includes the entire container yard 1, and shows images of the container groups 100 to 900 placed in the container yard 1 and images of lights 101 to 901 from the light sensors 3 provided on the containers 2 placed in the uppermost tiers of the respective container groups.

The position of each light source 3 can be identified as a position coordinate of the light 101 to 901 in the image 5. For example, when the vertical direction is y axis and the horizontal direction is x axis with the upper left corner of the image 5 as the point of origin, the respective position coordinates of the lights 101 to 901 can be expressed as follows by a coordinate (x,y):

position coordinate of light 101 (101_x,101_y);
position coordinate of light 201 (201_x,201_y);
position coordinate of light 301 (301_x,301_y);
position coordinate of light 401 (401_x,401_y);
position coordinate of light 501 (501_x,501_y);
position coordinate of light 601 (601_x,601_y);
position coordinate of light 701 (701_x,701_y);
position coordinate of light 801 (801_x,801_y); and
position coordinate of light 901 (901_x,901_y).

Figure 3:
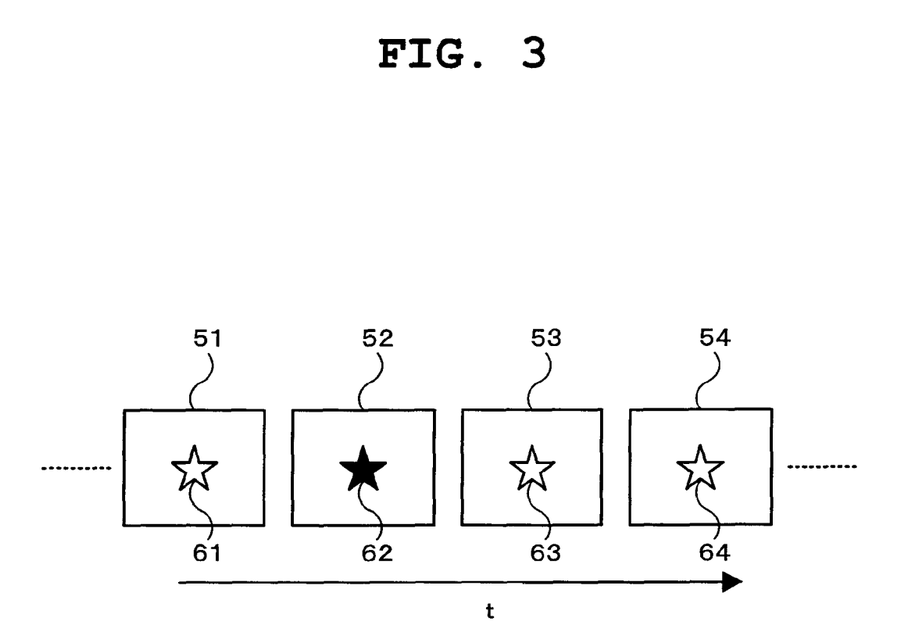
FIG. 3 is a conceptual diagram of information reproduced by the information receiving device 4.

FIG. 3 is a conceptual diagram of information reproduced by the information receiving device 4.

In FIG. 3, images 51 to 54 are frame images periodically outputted from the image sensor and aligned along a time line. In the images 51 to 54, lights 61 to 64 modulated by given information are shown.

Note that the lights 61 to 64 correspond to any of the lights 101 to 901 in FIG. 2.

In FIG. 3, the lights 61, 63 and 64 indicate a lighted state (or a high luminance state), and the light 62 indicates an unlighted state (or a low luminance state).

The flashing light pattern formed by the lights 61 to 64 is " . . . lighted state to unlighted state to lighted state to lighted state to . . . ". Accordingly, information transmitted by each light 101 to 901 (namely the ID of each container 2) can be reconstructed and reproduced from this flashing light pattern.

Next, an overall configuration of the information transmitting device 7 according to the embodiment will be described.

Figure 4:
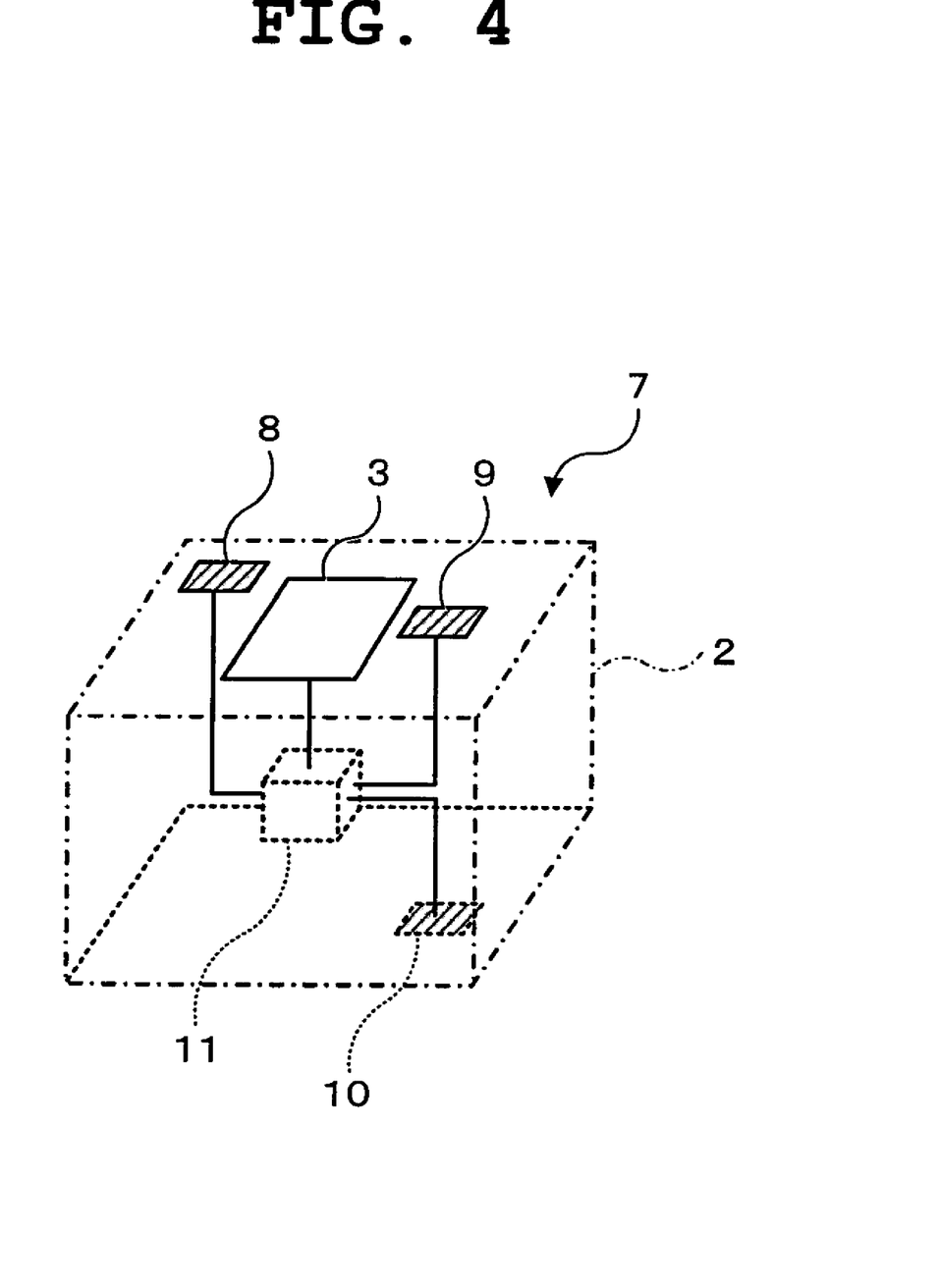
FIG. 4 is an overall configuration diagram of an information transmitting device 7.

FIG. 4 is a diagram of an overall configuration of the information transmitting device 7.

In FIG. 4, the information transmitting device 7 includes a stacking detection switch 8 and an output port connector 9 on the top surface of the container 2, as well as the above-described light source 3.

Furthermore, the information transmitting device 7 includes an input port connector 10 on the bottom surface of the container 2, and a control box 11 within the container 2.

The stacking detection switch 8 is used to detect whether or not another container 2 has been stacked onto the container 2 or, in other words, whether or not the container 2 has been placed in the uppermost tier. The output port connector 9 and the input port connector 10 are used to transmit information from the lower tier side to the upper tier side when the containers 2 are stacked in numerous tiers, and are designed such that the output port connector 9 of a container 2 on the lower tier side and the input port connector 10 of a container 2 on the upper tier side are connected.

The control box 11, which is constituted by, for example, a microcomputer, performs the overall control of the operation of the information transmitting device 7 and actualizes the above-described first function (function for generating ID) and second function (function for transmitting information from a lower tier to an upper tier and transmitting information from the light source 3 in the uppermost tier).

Figure 5:
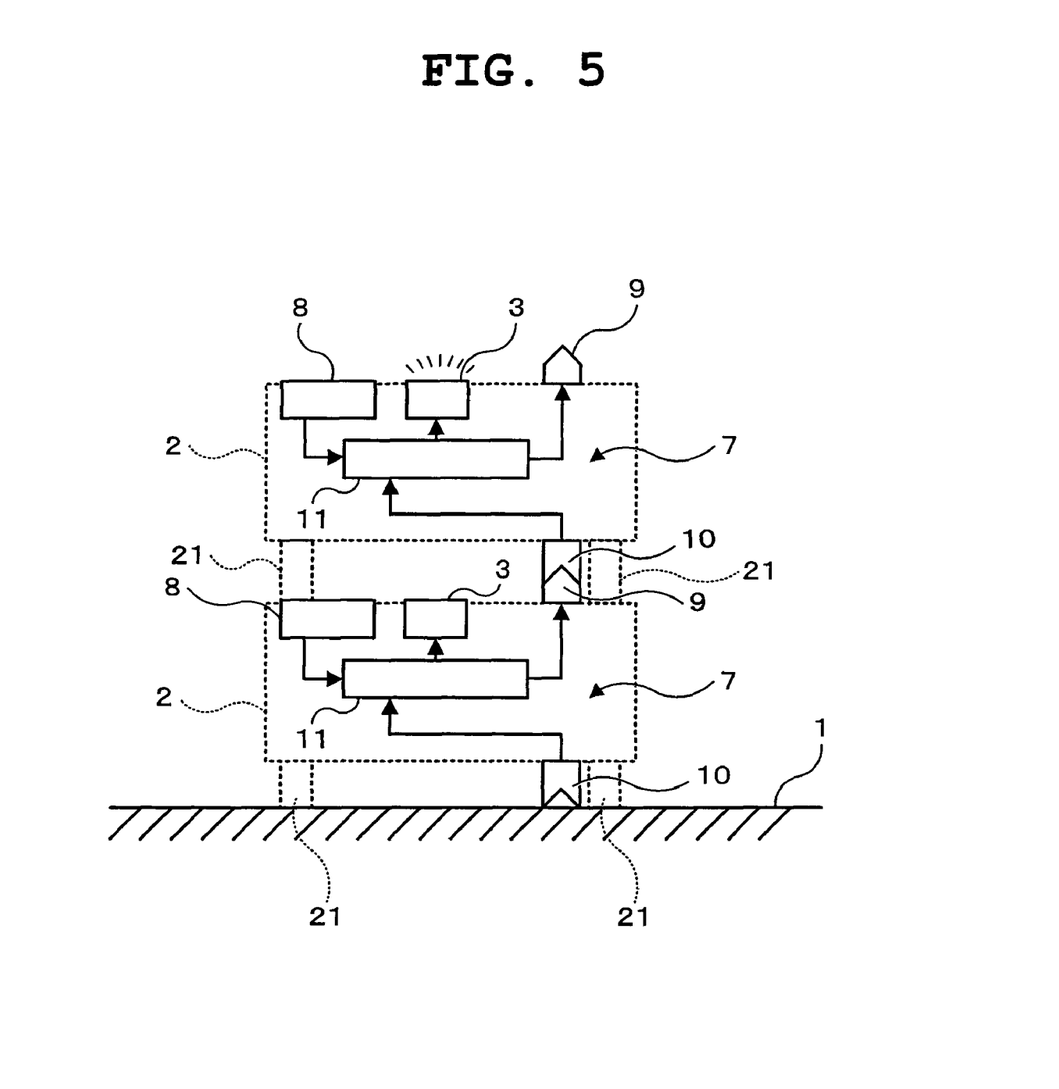
FIG. 5 is a conceptual diagram when containers are stacked into two tiers.

FIG. 5 is a conceptual diagram when the containers 2 are stacked in two tiers. In FIG. 5, two containers 2 that are stacked in two tiers are placed in the container yard 1. Each container 2 includes the information transmitting device 7, and leg sections 21 that project downward are provided in the four corners on the bottom surface of each container 2.

In the containers 2 stacked in two tiers, the relationship between each element of the information transmitting device 7 of the container 2 in the first tier and each element of the information transmitting device 7 of the container 2 in the second tier is as follows.

<First Tier>
a. stacking detection switch 8
Turned "ON" by the leg section 21 of the container 2 in the second tier (detects stacking)
b. Output port connector 9
Connected with the input port connector 10 of the container 2 in the second tier
c. Input port connector 10
Unused <Second Tier>
d. stacking detection switch 8
Turned "OFF"
e. Output port connector 9
Unused
f. Input port connector 10
Connected with the output port connector 9 of the container 2 in the first tier The information transmitting device 7 (control box 11) of the container 2 in the first tier judges that its own container is not located in the uppermost tier on the basis of above-described "a", and judges that its own container 2 is in the bottommost tier on the basis of above-described "c" (judges that no container 2 is present in a tier under its own container 2). Then, the information transmitting device 7 sends its own identification information (ID) to the information transmitting device 7 of the container 2 in the second tier via the output port connector 9 by above-described "b".

On the other hand, the information transmitting device 7 (control box 11) of the container 2 in the second tier judges that its own container 2 is located in the uppermost tier on the basis of above-described "d" and "e", and judges that another container 2 is present in a tier under its own container 2 on the basis of above-described "f". Then, the information transmitting device 7 joins its own identification information (ID) and the identification information (ID) from the lower tier received via the input port connector 10, and after generating transmission information including information indicating the "tier" to which each identification information belongs, modulates the transmission information, and controls "ON" and "OFF" of the light source 3 using the modulated information to perform the spatial transmission of light information.

Figure 6:
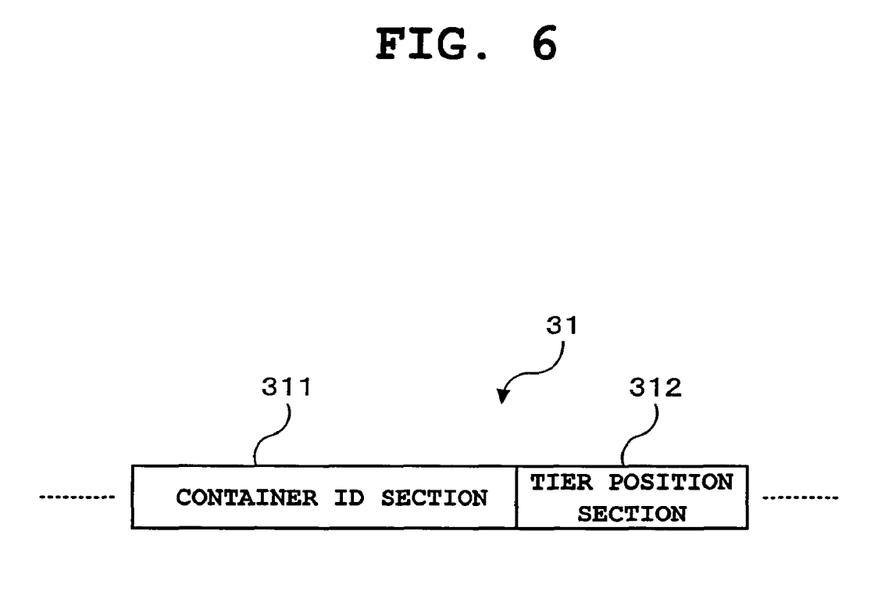
FIG. 6 is a diagram showing a format of transmission information.

FIG. 6 is a diagram of a format of transmission information. In FIG. 6, transmission information 31 is configured such that a pair formed by at least a container ID section 311 and a tier position section 312 is repeated. Note that an information start section, an information end section, an error correcting section, etc. may be included in addition thereto.

For example, when the containers 2 are stacked in two tiers (see FIG. 5), transmission information 12 is configured by two information, one for the first tier and one for the second tier.

The identification information (ID) of the first-tier container 2 is stored in the container ID section 311 of one transmission information 12, and tier information (such as "1") indicating the first tier is stored in the tier position section 312. Similarly, the identification information (ID) of the second-tier container 2 is stored in the container ID section 311 of the other transmission information 12, and tier information (such as "2") indicating the second tier is stored in the tier position section 312.

Figure 7:
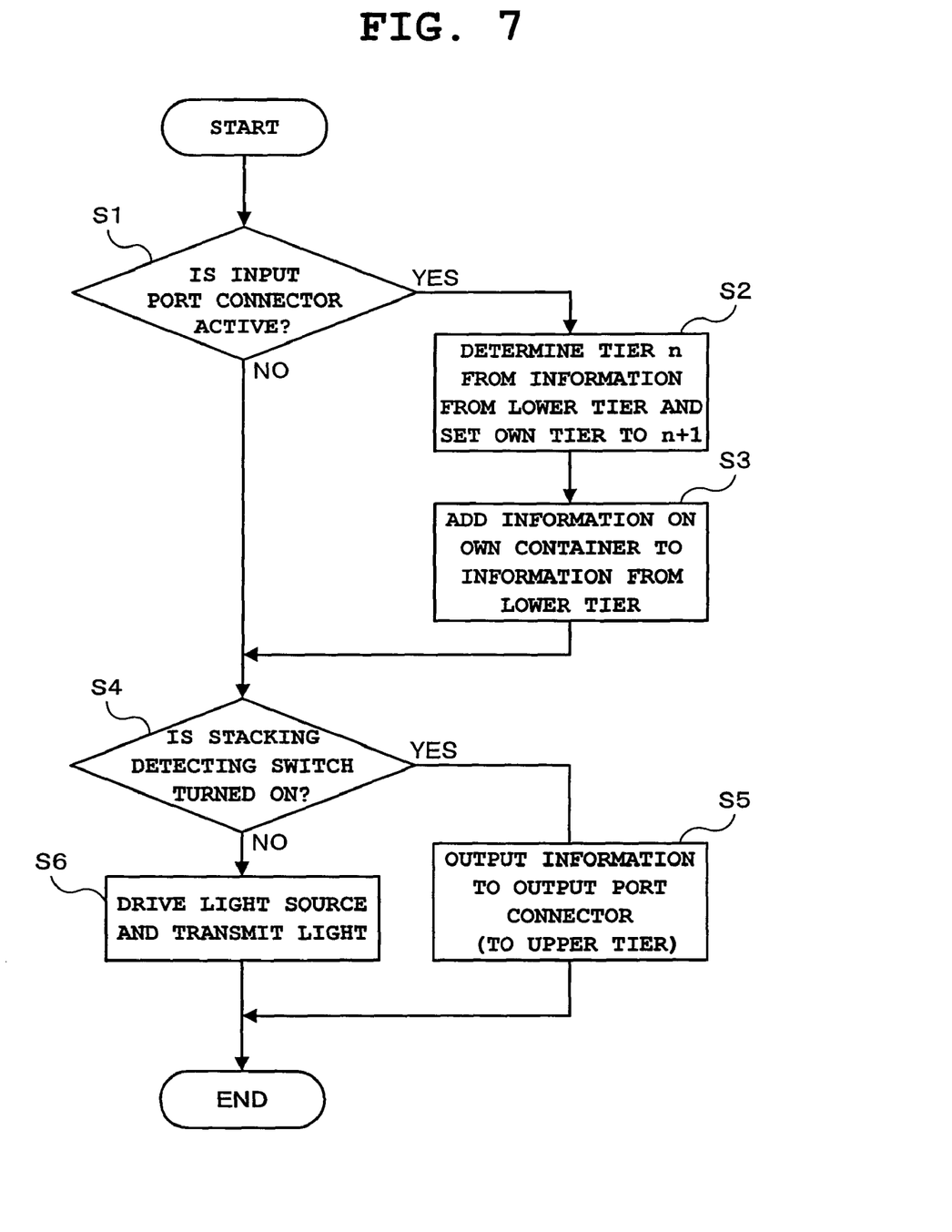
FIG. 7 is a diagram showing the main flow of a control program run by the information transmitting device.

FIG. 7 is a diagram showing the main flow of a control program run by the control box 11 of the information transmitting device 7.

In FIG. 7, when the control program is initiated, first, the control box 11 judges whether or not the input port connector 10 is active or, in other words, judges whether or not the input port connector 10 has been connected to the output port connector 9 of a container 2 in the lower tier (Step S1).

When judged that the input port connector 10 is not active, the control box 11 judges whether or not the stacking detection switch 8 is "ON" (Step S4).

Conversely, when judged that the input port connector 10 is active, the control box 11 judges that another container 2 is present under its own container 2, and after incrementing the tier n included in the information sent from the lower container 2 by 1 (+1), sets (n+1) as the tier n of its own container 2 (Step S2).

In addition, after adding the information on its own container 2 to the information sent from the lower tier (Step S3), the control box 11 judges whether or not the stacking detection switch 8 is "ON" (Step S4).

When judged that the stacking detection switch 8 is "ON", the control box 11 judges that its own container 2 is located in the uppermost tier, and after modulating the information sent from the lower tier and the added information on its own container 2, spatially transmits the modulated information by driving the light source 3 of its own container 2 (Step S6), and then terminates the program.

Conversely, when judged that the stacking detection switch 8 is not ON, the control box 11 judges that its own container 2 is not located in the uppermost tier, and after sending the information sent from the lower tier and the added information on its own container 2 to the container 2 in the upper tier via the output port connector 9 without modulating the information (Step S5), terminates the program.

The following effects are achieved by the information transmitting device 7 according to the embodiment.

(A) Identification information (ID) and location information of the containers 2 placed in the container yard 1 can be accurately grasped simply by installing the information receiving device 4 at a suitable observation point overlooking the entire container yard 1.

(B) In containers 2 that are stacked in numerous tiers, information (ID and tier position) of a container in a lower tier can be sent to the container 2 in the uppermost tier and spatially transmitted from the information transmitting device of the uppermost container 2 by light transmission. Accordingly, the information on the container 2 in the lower tier can be accurately grasped by the information receiving device 4.

In the description above, the container 2 is given as an example. However, the present invention is not limited thereto. The present invention can be applied to any object as long as the object is a cargo that is randomly placed in a large area with the possibility of being stacked.

In the description above, cargo handling management when the containers 2 are stacked is described. However, the present invention is not limited thereto.

Figure 8:
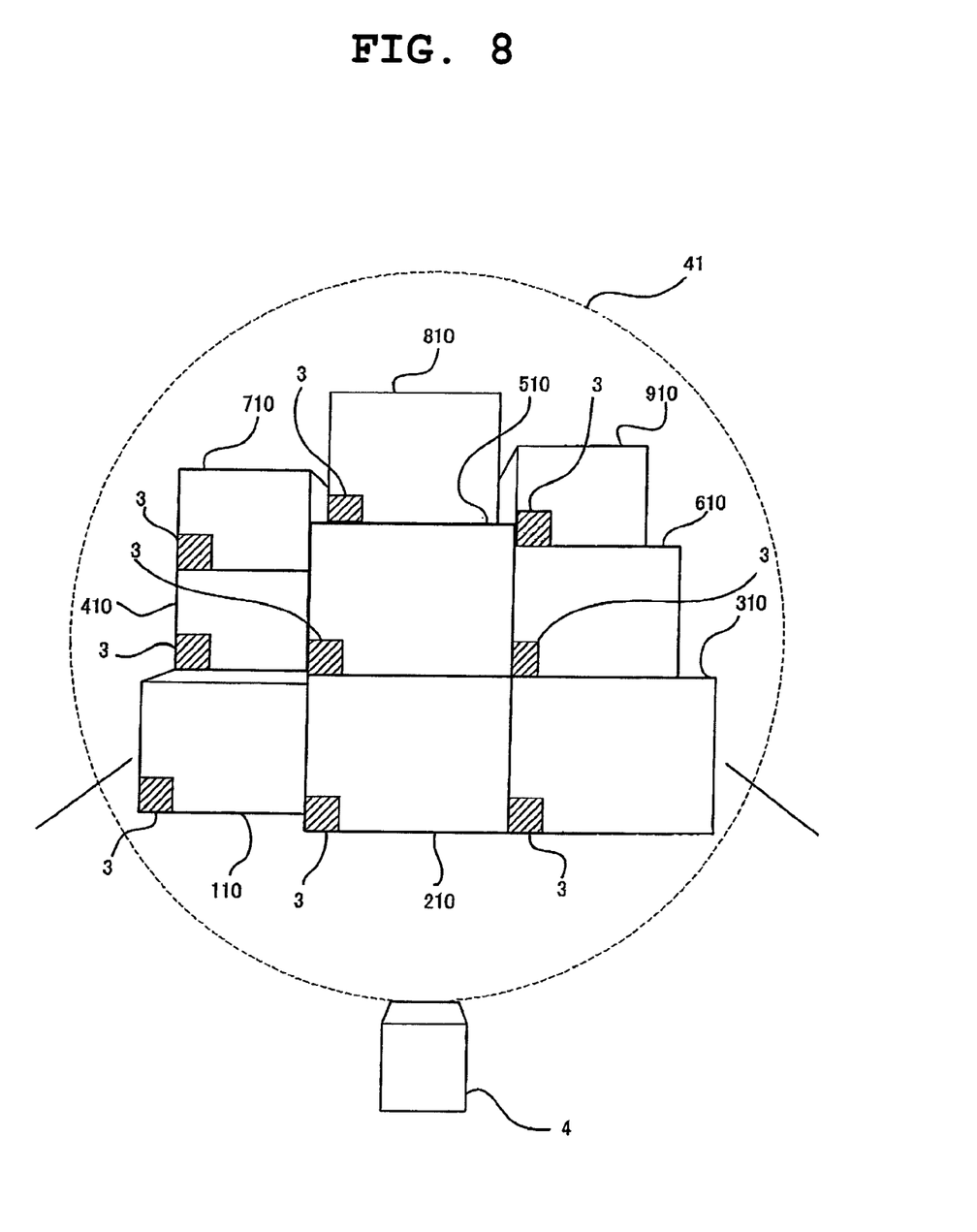
FIG. 8 is a usage schematic diagram of an information transmitting device according to another embodiment.

For example, as shown in FIG. 8, each container 2 in container groups 110 to 910 may include a light source 3 installed on a surface perpendicular to the imaging direction of the information receiving device 4 and be placed from furthest to nearest in parallel with the imaging direction.

In this instance, only the nearest container 2 of each container group 110 to 910 is included within an imaging range 41 of the information receiving device 4. However, as a result of each light source 3 flashing to indicate the presence of the containers in the center and rear areas of each container group 110 to 910, the information receiving device 4 can recognize the presence of the containers.

While the present invention has been described with reference to the preferred embodiments, it is intended that the invention be not limited by any of the details of the description therein but includes all the embodiments which fall within the scope of the appended claims.

What is claimed is:

1. An information transmitting device with a light emitting section provided on each respective object which can be arranged and placed so that a surface having the light emitting section can be hidden, comprising:

a first judgment means for judging whether or not in a condition where an own object provided with the information transmitting device can be monitored from an imaging direction of an external imaging device and is placed so as to hide the light emitting section installed on a first other object;

a reception means for receiving location information about the first other object transmitted from the information transmitting device installed on the first other object, when judged as affirmative by the first judgment means;

an addition means for adding location information of the own object provided with the information transmitting device to location information received by the reception means;

a modulation means for modulating location information received by the reception means and location information added by the addition means; and a first transmission means for transmitting location information to a storage space which is imaged in the external imaging device by controlling the light emitting section to repeatedly flash in terms of time based on location information modulated by the modulation means.

2. The information transmitting device according to claim 1, further comprising:

a second judgment means for judging whether or not in a condition where the own object provided with the information transmitting device can be monitored from the imaging direction of the external imaging device and is placed so as to hide the light emitting section installed on a second other object; and a second transmission means for transmitting location information received by the reception means and location information added by the addition means for the information transmitting device installed on the second other object without modulation by the modulation means, when judged as affirmative by both the first judgment means and the second judgment means.

3. The information transmitting device according to claim 1, further comprising:

a modulation control means for controlling to modulate location information of the own object provided with the information transmitting device to the modulation means, when judged as negative by the first judgment means.

4. The information transmitting device according to claim 2, further comprising:

a third judgment means for judging whether or not in a condition where the second other object can be monitored from the imaging direction of the external imaging device and is placed so as to hide the light emitting section installed on the own object provided with the information transmitting device; and a third transmission means for transmitting location information about the own object provided with the information transmitting device to the information transmitting device installed on the second other object without modulation by the modulation means, when judged as affirmative by the third judgment means and judged as negative by the first judgment means.

5. The information transmitting device according to claim 1, further comprising:

a first detection means for detecting a condition where the own object provided with the information transmitting device can be monitored from the imaging direction of the external imaging device and is placed so as to hide the light emitting section installed on the first other object;

wherein the first judgment means judges according to a detection result made by the first detection means.

6. The information transmitting device according to claim 2, further comprising:

a second detection means for detecting a condition where the own object provided with the information transmitting device can be monitored from the imaging direction of the external imaging device and is placed so as to hide the light emitting section installed on the second other object;

wherein the second judgment means judges according to a detection result made by the second detection means.

7. The information transmitting device according to claim 1, wherein location information about an object includes identification information for identifying an object from another object.

8. The information transmitting device according to claim 1, wherein location information about an object includes a stack position.

9. A non-transitory computer-readable storage medium having stored thereon a program that is executable by a computer in an information transmitting device with a light emitting section provided on each respective object which can be arranged and placed so that a surface having the light emitting section can be hidden, the program being executable by the computer to perform a process comprising:

first judgment processing which judges whether or not in a condition where an own object provided with the information transmitting device can be monitored from an imaging direction of an external imaging device and is placed so as to hide the light emitting section installed on a first other object;

reception processing which receives location information about the first other object transmitted from the information transmitting device installed on the first other object, when judged as affirmative by the first judgment processing;

addition processing which adds location information of the own object provided with the information transmitting device to location information received by the reception processing;

modulation processing which modulates location information received by the reception processing and location information added by the addition processing; and first transmission processing which transmits location information to a storage space that is imaged in the external imaging device by controlling the light emitting section to repeatedly flash in terms of time based on location information modulated by the modulation processing.

* * * * *